L. A. PECORE.
PLOW JOINTER.
APPLICATION FILED JUNE 1, 1912.
1,289,254.
Patented Dec. 31, 1918.
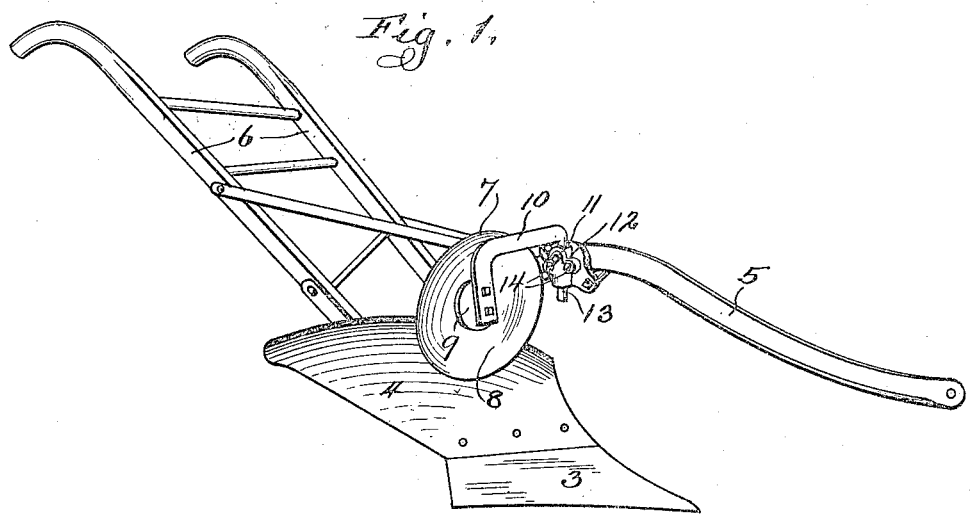
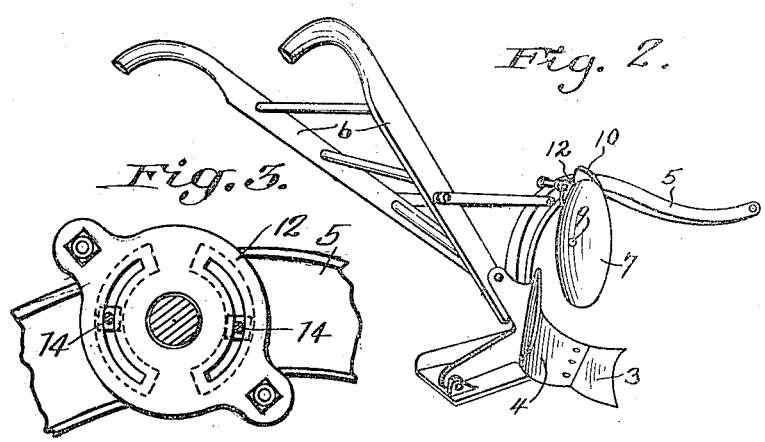
Witnesses:
M. J. McKendry
Julius M. Kahn
Inventor:
Louis A. Pecore
By R. J. Jack
Atty

UNITED STATES PATENT OFFICE.

LOUIS A. PECORE, OF DALLAS, WISCONSIN.

PLOW-JOINTER.

1,289,254.  Specification of Letters Patent.  Patented Dec. 31, 1918.

Application filed June 1, 1912.  Serial No. 701,452.

*To all whom it may concern:*

Be it known that I, LOUIS A. PECORE, a citizen of the United States, residing at Dallas, in the county of Barron and State of Wisconsin, have invented a new and useful Plow-Jointer, of which the following is a specification.

My invention relates to plow jointers in which a disk is employed as the jointer element and the objects of my improvements are, first, to mount the jointer which is in the form of a disk, on a pivot; second, to adjustably secure the jointer disk to the plow beam; third, to make the working surface of the disk of concave form; fourth, to make a cheap, effective and durable device and other features to become apparent from the description to follow.

Plow jointers of ordinary construction in general use consist of a miniature plow which is secured to the plow beam ahead of the plow and these of course have to be forced through the dirt or sod which on account of the sliding friction with the ground or dirt requires considerable power, furthermore it is necessary to remove the sod cutting knife from the plow beam when said plow jointers are attached, thus requiring the jointer to cut the sod and increasing the work required of the jointer. With my improved jointer, the sod cutting knife need not be removed from the plow beam when attaching the jointer and the friction between the jointer and the dirt or sod is greatly reduced because the disk rotates on a central pivot.

To describe my invention so that others versed in the art to which it pertains can make and use the same, I have illustrated it on the accompanying sheet of drawing forming a part of this specification, in which:—

Figure 1 is an elevation of a plow taken from the front-right side having my invention attached thereto; Fig. 2, is a similar view of the same taken from the rear-right side, and Fig. 3 is an enlarged detail view partly in section of a supporting block.

Similar reference characters refer to similar parts throughout the views.

The plow has the usual share 3, the moldboard 4, the beam 5 and the handles 6. It is to be noted that the jointer is particularly adapted for use when plowing sod. When plowing through sod without a jointer being attached to the plow, the edge of the sod which is thrown over by the moldboard in many places is not turned completely under and covered by dirt so that in a comparatively short time said edge of the sod will take root and grow surprisingly fast, thus resulting in a great deal of untilled soil. The disk 7 which has its one side 8 of concave form is pivotally mounted on a bearing 9 on the bracket 10, said bracket being rigidly held in position by the set screw 11 in the adjustable supporting block 12 attached to the beam 5. The bracket 10 has its one end 13 bent at an angle and round in cross section to fit into the socket formed in block 12, so that the disk 7 can be swung about the end 13 as a pivot when the set screw 11 is loosed. The block 12 is made to swing about an axis at right angles to the axial line of the end 13 and arranged to be securely held in any desired position by the set screws 14; thus the disk can be adjusted to any desired angle vertically and horizontally.

The disk 7 is set in such position that its lower edge will cut through the sod at the edge of the furrow being turned or thrown over by the moldboard after the sod has left the moldboard and its concave side 8 will so act on said sod as to completely turn the extreme edge of the sod under the dirt or what normally was the under part of the sod, thus completely covering the edge of the sod and prevent any part of the old sod from catching root and growing.

Unlike all other devices heretofore used my disk or jointer is in a position above the mold-board and not above the share. My device takes into the sod after the sod has been lifted and partly turned by the mold-board, while those heretofore used cut into the sod before the mold-board did.

Having thus fully described my invention what I claim as new and desire to secure by Letters Patent of the United States is:—

1. In combination with a plow provided with a beam and a moldboard, a disk rotatably mounted in a position to cut into and turn down the edge of the sod just after the sod has left the moldboard, a supporting bracket extending laterally over the moldboard having one end secured to the beam and the other end provided with a bearing on which the disk is mounted, said disk being positioned substantially above the center of the moldboard with respect to the front and rear ends thereof.

2. In combination with a plow provided with a beam and a moldboard, a disk rotatably mounted in a position to cut into and turn down the edge of the sod just after the sod has left the moldboard, a supporting bracket extending laterally over the moldboard having one end adjustably secured to the beam, an adjustable supporting block attached to the beam to which one end of the said bracket is secured, the remaining end of said bracket provided with a bearing on which the disk is mounted, said disk being positioned substantially above the center of the moldboard with respect to the front and rear ends thereof.

In testimony whereof I have signed my name to this specification in presence of two subscribing witnesses this 28th day of August, 1911, at Dallas, Wisconsin.

LOUIS A. PECORE.

Witnesses:
J. G. JOHNSON,
F. G. JOHNSON.